US006444898B1

(12) United States Patent
Fujisawa et al.

(10) Patent No.: US 6,444,898 B1
(45) Date of Patent: *Sep. 3, 2002

(54) TRANSPARENT LAYERED PRODUCT AND GLASS ARTICLE USING THE SAME

(75) Inventors: Akira Fujisawa; Masahiro Hirata; Tsuyoshi Otani; Akihiko Hattori, all of Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/594,263

(22) Filed: Jun. 15, 2000

(30) Foreign Application Priority Data

Jun. 18, 1999 (JP) ............................................. 11-173214
Mar. 22, 2000 (JP) ........................................ 2000-080964

(51) Int. Cl.[7] ...................... H01L 31/04; C03C 17/245; C03C 17/34; E06B 3/66
(52) U.S. Cl. ...................... 136/256; 136/244; 136/251; 257/432; 257/434; 428/432; 428/336; 428/142; 428/141; 428/702; 428/701; 52/786.1; 52/786.13; 52/479; 427/585; 427/258; 427/266; 427/419.2
(58) Field of Search ................................. 136/256, 244, 136/251; 257/432, 434; 428/432, 336, 142, 141, 702, 701; 52/786.1, 786.13, 479; 427/585, 258, 266, 419.2

(56) References Cited

U.S. PATENT DOCUMENTS

| 4,207,119 | A | * | 6/1980 | Tyan ............................ 136/258 |
| 4,273,826 | A | * | 6/1981 | McCollister et al. ........ 428/304 |
| 4,371,740 | A | * | 2/1983 | Clem ........................... 136/256 |
| 4,440,822 | A | * | 4/1984 | Gordon ........................ 428/216 |
| 4,732,621 | A | | 3/1988 | Murata et al. ............... 136/256 |
| 4,808,462 | A | * | 2/1989 | Yaba et al. ................... 428/142 |
| 4,835,040 | A | | 5/1989 | Callies et al. ................ 428/215 |
| 5,254,904 | A | | 10/1993 | Van De Leest et al. ..... 313/479 |
| 5,393,563 | A | | 2/1995 | Ellis, Jr. ..................... 427/248.1 |
| 5,811,191 | A | * | 9/1998 | Neuman ....................... 428/427 |
| 6,362,414 | B1 | * | 3/2002 | Fujisawa et al. ............. 136/256 |

FOREIGN PATENT DOCUMENTS

| DE | 3436618 | | 10/1984 |
| EP | 0 309 902 | | 4/1989 |
| EP | 0 597 490 | | 5/1994 |
| EP | 0 782 975 | | 7/1997 |
| EP | 1057796 A1 | * | 12/2000 |
| EP | 1061586 A1 | * | 12/2000 |
| JP | 60-77150 | | 5/1985 |
| JP | 61-288473 | | 12/1986 |
| JP | 2-503615 | | 10/1990 |
| JP | 4-133360 | | 5/1992 |
| JP | 5-157902 | | 6/1993 |
| JP | 7-41337 | | 1/1995 |
| JP | 7-29402 | | 4/1995 |
| WO | WO 98/06675 | | 2/1998 |

OTHER PUBLICATIONS

Ruzakowski et al, J. Vac. Sci. Technol. B 14(6), Nov./Dec. 1996, pp. 3436–3444.*
P. Ruzakowski Athens et al., "Use of Multiple Analytical Techniques to Confirm Improved Optical Modeling of $SnO_2$:F Films by Atomic Force Microscopy and Spectroscopic Ellipsometry", J. Vac. Sci. Technol. B 14(6) Nov./Dec. 1996, pp. 3436–3444.
Sanyal et al., "Chemical Vapour Deposition of Hot End Coatings on Glass from Stannic Chloride", *Glass Technology*, vol. 23, No. 6, pp. 271–276, Dec. 1982.

* cited by examiner

*Primary Examiner*—Alan Diamond
(74) *Attorney, Agent, or Firm*—Merchant & Gould PC

(57) ABSTRACT

A transparent layered product in which the ratio of a refractive-index transition layer at the surface of a coating film is set to be a suitable ratio for increasing light transmittance is provided. In a coating film with a rough surface formed on a glass sheet, the thickness of a transition layer in which the refractive index varies continuously in its thickness direction is set to be in a range between 13% and 65% of the thickness of a layer having a substantially constant refractive index in the coating film.

9 Claims, 6 Drawing Sheets

TRANSPARENT LAYERED PRODUCT AND GLASS ARTICLE USING THE SAME

FIELD OF THE INVENTION

The present invention relates to a transparent layered product including a glass sheet and a coating film with a rough surface and to a glass article using the same (for example, a photoelectric conversion device, a multiple-glazing unit, or the like).

BACKGROUND OF THE INVENTION

A transparent layered product in which a thin film such as a tin oxide film or the like is formed on a glass sheet has been used widely for a thin film photoelectric conversion device (a thin film solar cell) or the like. It has been known that tin oxide in a film formed on a glass sheet by a pyrolytic process becomes a polycrystalline product. The polycrystalline product of tin oxide has a surface with roughness caused by the growth of crystal grains according to the increase in film thickness. In a thin film photoelectric conversion device, the surface roughness of a tin oxide film as a transparent electrode enables conversion efficiency to be improved by a light trapping effect. Therefore, various aspects of the shape of the surface roughness of a tin oxide film have been studied.

For example, JP 61-288473 A discloses a thin film photoelectric conversion device including a tin oxide film having a rough surface including convex portions with heights in the range between 100 and 500 nm and intervals between respective convex portions in the range between 200 and 1000 nm. The rough surface is formed by etching after film formation.

Further, JP 2-503615 A discloses a substrate for a thin film photoelectric conversion device including a tin oxide film having a surface provided with convex portions having diameters in the range between 0.1 and 0.3 μm and a ratio of height/diameter in the range between 0.7 and 1.2. In addition, JP 2-503615 A also discloses a chemical vapor deposition method (a CVD method) using a mixed gas containing tin tetrachloride, water vapor, methyl alcohol, nitrogen and the like, which is carried out on a precut glass sheet, as a method of manufacturing a tin oxide film.

JP 4-133360 A discloses a thin film photoelectric conversion device including a tin oxide film having a surface with pyramidal convex portions with heights in the range between 100 and 300 nm and angles with respect to the normal line of the principal plane of its substrate in the range between 30° and 60°. Similarly, JP 4-133360 A also discloses a CVD method using a mixed gas containing tin tetrachloride, oxygen, nitrogen and the like, which is carried out on a glass sheet with a temperature in the range between 350° C. and 500° C., as a method of manufacturing a tin oxide film.

Besides the tin oxide film, coating films formed of zinc oxide, ITO (indium tin oxide), titanium oxide, or the like also are formed on a glass sheet to add various functions. The coating films also have surfaces with roughness caused by the growth of crystal grains, although the roughness varies depending on the manufacturing method or the like. These coating films are formed on a glass sheet as, for example, a reflection-suppression film, an electromagnetic shielding film, an antifouling film, a low-emissivity film (Low-E film), or as a component of such films, in addition to a transparent conductive film.

Judging from the fact that a porous surface has a refractive index distribution in the depth direction, it is conceivable that a transition layer with a refractive index distribution is present at the surface of a coating film having a rough surface. The thickness of the transition layer can affect the light transmittance of a transparent layered product. Conventionally, however, attention merely has been paid to the physical shape and size of convex or concave portions of the rough surface particularly in a tin oxide film. The thickness of the transition layer produced at the surface of the coating film does not depend only on the shape and size of the individual convex or concave portions of the rough surface but also is affected by the distributions of the shape and size of them. Therefore, the transition layer should not be evaluated based on the observation of the rough surface in a very limited region by an electron microscope and is required to be evaluated based on optical measurement.

SUMMARY OF THE INVENTION

It is an object of the present invention that in a transparent layered product including a glass sheet and a coating film exhibiting various functions, the light transmittance of the transparent layered product is increased by suitably controlling the thickness of a transition layer at the surface of the coating film. Further, another object of the present invention is to provide a glass article using this transparent layered product, particularly a photoelectric conversion device such as a photovoltaic device.

The present inventors found that the aforementioned objects were able to be achieved by setting the ratio in the thickness of the transition layer in the coating film to be a predetermined ratio. The transparent layered product of the present invention includes a glass sheet and a coating film having a surface with roughness, which is formed on the glass sheet, and a transition layer in which the refractive index varies continuously in its thickness direction is present at the surface of the coating film. The transition layer has a thickness in a range between 13% and 65% of the thickness of a layer having a substantially constant refractive index in the coating film.

When the coating film is formed as an outermost layer, the refractive index in the transition layer varies continuously in its thickness direction to approach the refractive index of air (1) from the refractive index of the coating film, in the direction of the outside air. On the other hand, when another thin film is further formed on the coating film, the refractive index in the transition layer approaches the refractive index of the another thin film while varying continuously in its thickness direction.

In the transparent layered product, it is preferable that the coating film is a crystalline coating film. It also is preferable that the roughness is caused by crystal grains in the crystalline coating film. In this connection, the crystalline coating film may contain amorphous portions regionally, and a film with a crystalline fraction in volume of at least 50% as a whole is taken as corresponding to a "crystalline" film.

In the transparent layered product, it is preferable that the crystalline coating film contains, as a main component, at least one selected from tin oxide, zinc oxide, indium oxide, and titanium oxide. Particularly, a coating film containing tin oxide as the main component is useful for many purposes. In this specification, the "main component" denotes a component accounting for at least 50 wt. % of the Whole amount.

In the transparent layered product, it is preferable that the coating film is formed on an undercoating film on the glass sheet. The formation of the undercoating film serves as a means for adjusting the ratio of the transition layer. In this case, it is further preferable that the undercoating film is a coating film formed by pyrolysis of a material containing halogen, and the undercoating film has a surface with roughness caused by production of or loss after the production of compound grains of an alkaline component in the glass sheet and the halogen.

In the transparent layered product, it is preferable that the thickness of the coating film is in a range between 400 nm and 1200 nm. The thickness also is one of the factors affecting the ratio of the transition layer. Particularly, when the roughness is caused by the crystal grains, generally the roughness at the surface tends to increase as the crystal grains grow.

In the transparent layered product, the coating film may be an insulating coating film, but preferably is a conductive coating film (a transparent conductive film).

The transparent layered product can be used for various purposes. For example, it can be used as reflection-suppression (anti-reflection) glass, electromagnetic shielding glass, glass to be electrified for preventing fogging (defogging glass), antifouling glass, antistatic glass, low-emissivity glass (Low-E glass), glass for information display equipment, or glass for a top plate of a duplicator.

The transparent layered product may be used as a glass article by being combined with other members. For example, the present invention includes a multiple-glazing unit in which at least two transparent substrates are positioned to face each other via at least one inner layer selected from a group consisting of an air layer, an inert gas layer, and a low pressure layer and at least one of the transparent substrates is the transparent layered product.

The transparent layered product also can be used as a substrate for a photoelectric conversion device. The photoelectric conversion device includes: a transparent layered product having a glass sheet and a conductive crystalline coating film, which is formed on the glass sheet; at least one photoelectric conversion unit; and a back electrode. The crystalline coating film includes, on its surface, a transition layer in which the refractive index varies continuously in its thickness direction. The photoelectric conversion unit and the back electrode are stacked on the crystalline coating film in this order. The transition layer has a thickness in a range between 13% and 65% of the thickness of a layer having a substantially constant refractive index in the crystalline coating film.

DETAILED DESCRIPTION OF THE INVENTION

Preferable embodiments according to the present invention are described as follows.

Figure 1:
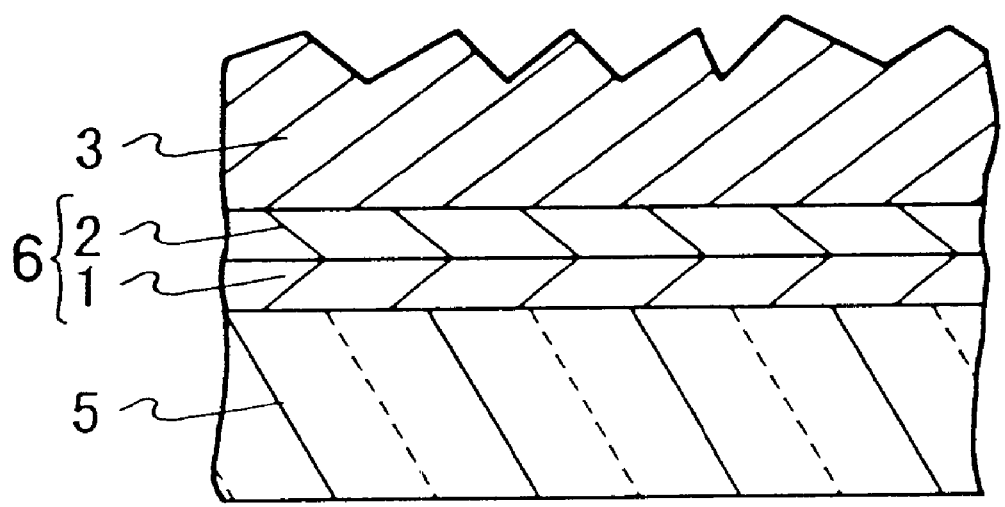
FIG. 1 is a sectional view showing an embodiment of a transparent layered product according to the present invention.

FIG. 1 is a sectional view of an embodiment of the transparent layered product according to the present invention. In this transparent layered product, an undercoating film 6 including a first undercoating layer 1 and a second undercoating layer 2, and a crystal line coating film 3 are formed on a glass sheet 5 in this order.

The following description is directed to a preferable embodiment when the crystalline coating film 3 is used as a transparent electrode in a photoelectric conversion device. As the crystalline coating film, a tin oxide film doped with a trace element such as fluorine, antimony, or the like, specifically a fluorine-containing tin oxide film (a $SnO_2$:F film) doped with fluorine at a predetermined concentration is preferable. Preferably, the fluorine concentration in the film is 0.15 wt. % or lower. This film has a refractive index of about 1.9. This crystalline coating film may contain other trace components such as silicon, aluminum, zinc, copper, indium, bismuth, gallium, boron, vanadium, manganese, zirconium, or the like. Preferably, however, the total concentration of such trace components is 0.02 wt. % or lower. It is preferable that the sheet resistance of the crystalline coating film is, specifically, in the rang e between 5Ω/sq. (Ω/□) and 25Ω/sq.

It is preferable that the first undercoating layer 1 has a thickness in the range between 5 nm and 100 nm and a refractive index in the range between 1.6 and 2.5. Preferably, the first undercoating layer 1 is formed of at least one selected from tin oxide, titanium oxide, and aluminum oxide. It is preferable that the second undercoating layer 2 has a thickness in the range between 5 nm and 100 nm and a refractive index in the range between 1.4 and 2.0. Preferably, the second undercoating layer 2 is formed of at least one selected from silicon oxide, aluminum oxide, and tin oxide. Furthermore, it is preferable that the refractive index of the first undercoating layer is higher than that of the second undercoating layer.

The structure of the undercoating film 6 is not limited to the two-layer structure, and the undercoating film 6 may be formed of a single layer or three layers or more. A layer in which the refractive index varies continuously may be included between the first undercoating layer and the second undercoating layer.

Layers included in the undercoating film may contain, as the main component, an oxide containing at least two metals such as, for example, silicon-tin oxide (SiSnO). Other preferable examples of the layers include a film containing, as the main component, oxycarbide such as for instance silicon oxycarbide (SiOC), or oxynitride. Generally, an oxycarbide film or an oxynitride film in which carbon or nitrogen is introduced has a slightly higher refractive index than that of an oxide film.

As described above, the transparent layered product of the present invention can be used not only in a photoelectric conversion device but also in a wide variety of technical fields. The structure, type, and thickness of a coating film are determined suitably depending on the intended use of the transparent layered product. For instance, the coating film may be used as antifouling glass preventing the transparent layered product from fouling by forming a titanium oxide film as the crystalline coating film to utilize its photocalytic effect. Even when having a property as a transparent conductive film, the crystalline coating film can be used as an electromagnetic shielding film, an antistatic film, a low-emissivity film (a Low-E film), a film for generating heat by electrification, or the like.

In the transparent layered product, the transition layer in which the refractive index varies continuously in its thickness direction is present at the surface of the crystalline coating film 3. It is preferable that when the crystalline coating film is used as an outermost layer, the refractive index of the transition layer varies continuously in its thickness direction from the refractive index of the coating film (for example, a refractive index of about 1.9 for tin oxide) to the refractive index of air (1). On the other hand, it is preferable that when a thin film is further formed on the crystalline coating film as in the case where the transparent layered product is used in a thin film solar cell, the refractive index in the transition layer varies continuously from the refractive index of the crystalline coating film (for example, about 1.9) to the refractive index of the thin film (for instance, a refractive index of about 4.7 for amorphous silicon or a refractive index of about 2.8 for amorphous silicon carbide).

In the transparent layered product, the thickness of the transition layer is adjusted to be in a range between 13% and 65% of the thickness of a layer having a substantially constant refractive index (a nontransition layer) in the crystalline coating film. When the ratio of the transition layer is too low, the refractive index varies abruptly to cause high reflectance. On the contrary, when the ratio of the transition layer is too high, absorption by the crystalline coating film including the transition layer increases, thus decreasing transmittance in some cases.

Not all the factors affecting the ratio of the transition layer have been clarified. However, in addition to the presence of the undercoating film and the total film thickness, manufacturing conditions also affect the ratio. For example, when films are deposited by a CVD method, the substrate temperature (glass temperature) is an important factor to be controlled. When the glass temperature is too low, the ratio of the transition layer tends to be low. On the contrary, when the glass temperature is too high, the ratio of the transition layer may be excessively high in some cases.

Figure 2:
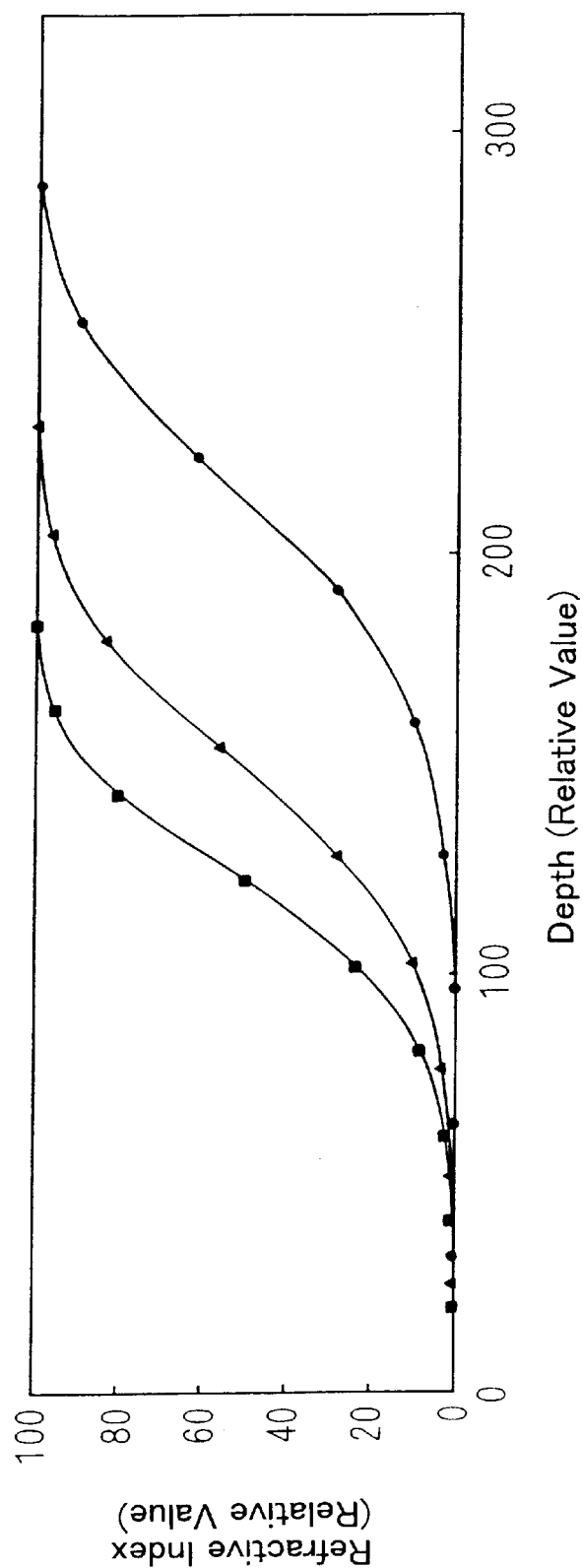
FIG. 2 is a graph showing examples of curves indicating refractive index distribution in a surface layer of a crystalline coating film in a transparent layered product according to the present invention.

FIG. 2 shows examples of refractive index distribution in the vicinity of a transition layer in a transparent layered product produced in the examples described later. FIG. 2 shows variations in refractive index corresponding to the distance from the highest part (the top of a convex portion) of the surface of the crystalline coating film in the depth direction. As shown in FIG. 2, the refractive index varies little in the vicinity of the highest part (the top of a convex portion). The same is true for the vicinity of the lowest part (the bottom of a concave portion) of the surface of the crystalline coating film. The curves indicating the refractive indexes are approximately S-shaped curves on a plane defined by a vertical axis indicating refractive indexes and a horizontal axis indicating the distance from the surface (the vicinity of the top of the convex portion) of the crystalline coating film in the depth direction. In such curves (in which curvatures vary through points of inflection in a manner that the variation in refractive index per unit thickness in the vicinities of both ends of the transition layer in its thickness direction is reduced gradually), no abrupt change in refractive index is included.

From the curves as shown in FIG. 2, it is difficult to determine the thickness of the transition layer precisely. Therefore, in the present specification, specifically, the thicknesses of the "transition layer" are defined as the thickness in a range corresponding to the range between 5% and 95% of the variation in refractive index as a whole (i.e. the range excluding variations below 5% and above 95%). The refractive index varying within a range below 5% is considered as being substantially constant to define the range of "a layer having a substantially constant refractive index" in the crystalline coating film.

Conventionally, the shapes and heights of convex and concave portions of a rough surface have been determined mainly by observing a film surface by an electron microscope. Usually, the observation by the electron microscope is carried out over a very limited region. Therefore, this is suitable as a method for checking the shapes of the convex and concave portions regionally, but is not suitable as a method for determining the variation in refractive index at the surface of the coating film.

Appropriately, the thickness of the transition layer is measured using an atomic force microscope as described later.

Attention also must be paid to the fact that the thickness of the transition layer cannot be determined precisely simply by measuring the average value or the range of the heights of the convex portions at the surface, which also is clear from FIG. 2.

One of the advantageous methods of manufacturing the transition layer with a preferable ratio is a pyrolytic method, particularly a CVD method, which is carried out on a glass ribbon in a glass sheet production line using a float glass process.

It is assumed that when film deposition is carried out on a high-temperature glass ribbon by the CVD method, crystalline nuclei are produced at the surface of the glass ribbon. When the crystalline nuclei are present at the glass surface, the growth of the crystal grains in forming a crystalline coating film is affected even when the coating film is formed on an undercoating film. It is conceivable that these crystalline nuclei are formed from, for example, tin particles adhering to the surface of the glass ribbon in a float bath or a compound of sodium chloride produced by the reaction between chlorine contained in a coating film material and sodium diffused from the high-temperature glass ribbon.

The method of manufacturing the transparent layered product according to the present invention is not limited to the CVD method carried out on the glass ribbon. However, the CVD method carried out on the glass ribbon allows film deposition to be carried out under a high temperature condition easily, and therefore is suitable for manufacturing the transparent layered product of the present invention. However, an excessively high temperature of the glass ribbon may cause an excessively high ratio in thickness of the transition layer. Usually, therefore, it is preferable that the glass ribbon has a temperature in the range between about 615° C. and 715° C.

As described above, the structure and thickness of the undercoating film also affect the ratio of the transition layer. For instance, as shown in FIG. 1, in the case where the undercoating film 6 is formed to have a two-layer structure, when the first undercoating layer is formed by a CVD method using a chlorine-containing material, sodium diffused from the glass and chlorine react to produce sodium chloride in the film, thus increasing the roughness of the undercoating film. When utilizing this roughness, the transition layer can be increased in thickness. On the other hand, the second undercoating layer may have an effect of decreasing the ratio of the transition layer with the increase in its thickness, which is conspicuous particularly when a silicon oxide film is used.

According to the CVD method carried out on a high-temperature glass ribbon, thermal energy in forming glass also can be utilized. This preferable manufacturing method is particularly suitable for manufacturing a substrate for a photoelectric conversion device or low-emissivity glass, which may be required to be manufactured as a large product for a large window glass, roofing material, or the like. When the CVD method is carried out in a float bath, the film deposition can be carried out on the surface of glass having a temperature equal to or higher than the softening point. The film deposition at a high temperature enables improvements in film performance, film growth rate, and film deposition reaction efficiency. In addition, defects such as pinholes can be suppressed.

Figure 3:
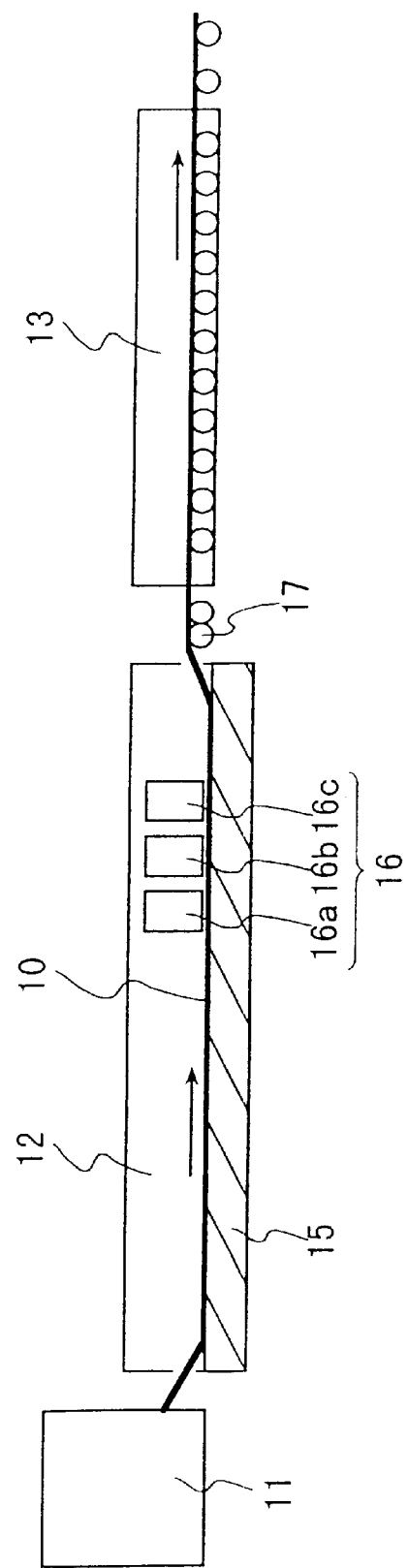
FIG. 3 is a structural view of a device that can be used for manufacturing a transparent layered product according to the present invention.

FIG. 3 shows an embodiment of a device for depositing a film on a glass ribbon in the float glass process by the CVD method. As shown in FIG. 3, in this device, a predetermined number of coaters 16 (three coaters 16a, 16b, and 16c in the embodiment shown in the figure) are placed at a predetermined distance from the surface of a glass ribbon 10. The glass ribbon 10 is formed from molten glass, which is poured from a furnace 11 into a float bath 12, in a belt-like form on a tin bath 15 while traversing the length of the float bath 12. The number and arrangement of the coaters are selected suitably depending on the kind and thickness of a coating film to be formed. These coaters supply gaseous materials to form coating films on the glass ribbon 10 continuously. When a plurality of coaters are used, an undercoating film and a crystalline coating film can be formed on the glass ribbon 10 successively by the CVD method. The glass ribbon 10 on which the coating films including the crystalline coating film have been formed is lifted by a roller 17 and is carried into an annealing furnace 13. The glass ribbon annealed in the annealing furnace 13 is cut by a cutting device, which is not shown in the figure, thus obtaining a glass sheet with a predetermined size.

Examples of the tin material in the case of using the CVD method include tin tetrachloride, dimethyltin dichloride, dibutyltin dichloride, tetramethyltin, tetrabutyltin, dioctyltin dichloride, monobutyltin trichloride, or the like, and particularly, organic tin chlorides such as dimethyltin dichloride (DMT) and monobutyltin trichloride (MBTC) are preferable. Oxidizing agents used for obtaining tin oxide from the tin material include oxygen, water vapor, dry air, or the like. Examples of the fluorine material include hydrogen fluoride, trifluoroacetic acid, bromotrifluoromethane, chlorodifluoromethane, or the like. When antimony is to be added, antimony pentachloride, antimony trichloride, or the like may be used.

Silicon materials used when a suitable silicon oxide film is deposited as the undercoating film by the CVD method include silane (monosilane), disilane, trisilane, monochlorosilane, dichlorosilane, 1,2-dimethylsilane, 1,1,2-trimethyldisilane, 1,1,2,2-tetramethyl disilane, tetramethyl orthosilicate, tetraethyl orthosilicate, or the like. In this case, oxidizing agents include oxygen, water vapor, dry air, carbon dioxide, carbon monoxide, nitrogen dioxide, ozone, or the like. When silane is used, for the purpose of preventing the silane from reacting before reaching the glass surface, an unsaturated hydrocarbon gas such as ethylene, acetylene, toluene, or the like may be used also.

Similarly, aluminum materials used when a suitable aluminum oxide film is deposited as the undercoating film by the CVD method include trimethylaluminum, aluminum triisopropoxide, diethylaluminum chloride, aluminum acetylacetonate, aluminum chloride, or the like. In this case, oxygen, water vapor, dry air, or the like can be used as an oxidizing agent.

Figure 4:
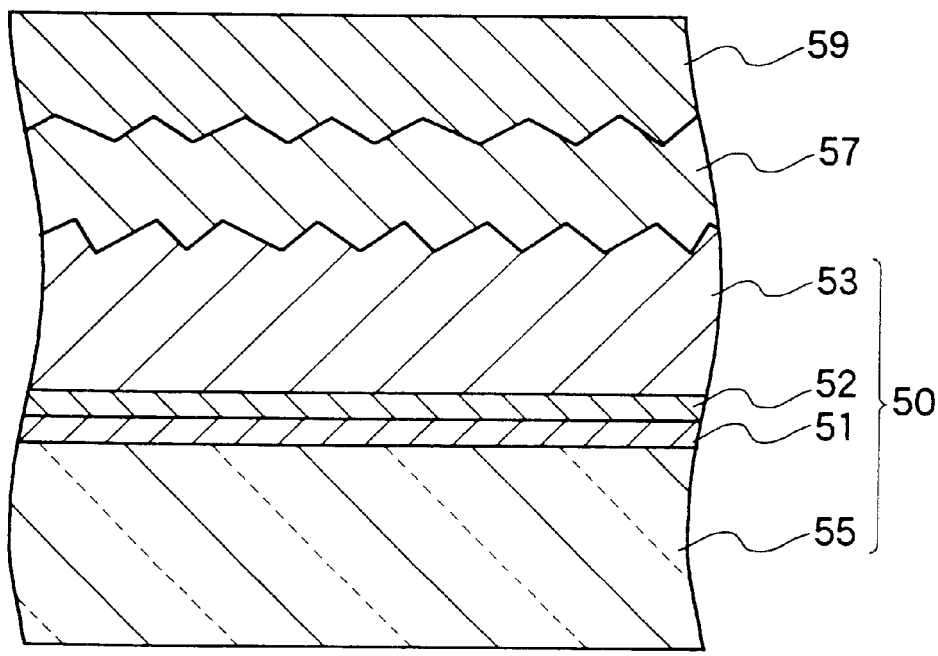
FIG. 4 is a sectional view of an embodiment of a photoelectric conversion device according to the present invention.

FIG. 4 shows a cross section of an embodiment of a thin film photoelectric conversion device (a thin film silicon-based photoelectric conversion device) using a transparent layered product of the present invention as its substrate.

In this thin film silicon-based photoelectric conversion device, on a substrate (a transparent layered product) 50 for a photoelectric conversion device in which first and second undercoating films 51 and 52 and a conductive crystalline coating film 53 are formed on a glass sheet 55 in this order, a photovoltaic unit 57 is formed and further a back electrode 59 is formed thereon.

The photovoltaic unit can be formed of a single layer as shown in the figure, but also may be formed by stacking a plurality of layers. Examples of the photovoltaic unit include a unit in which an amorphous silicon-based thin film or a crystalline silicon-based thin film is used as a photovoltaic layer (hereinafter the respective units are indicated by referring to the kind of the photovoltaic layer, such as "an amorphous silicon-based thin film photovoltaic unit" and "a crystalline silicon-based thin film photovoltaic unit").

An amorphous silicon-based thin film photovoltaic unit can be formed by depositing respective p-type, i-type, and n-type semiconductor layers in this order by a plasma CVD method. Specifically, for example, it may be formed by depositing a p-type microcrystalline silicon-based layer doped with at least 0.01 atom % boron as an impurity atom determining its conductive type, an intrinsic amorphous silicon layer to be a photovoltaic layer, and an n-type microcrystalline silicon-based layer doped with at least 0.01 atom % phosphorus as an impurity atom determining its conductive type in this order. However, these respective layers are not limited to those mentioned above. For instance, the impurity atom in the p-type microcrystalline silicon-based layer may be aluminum or the like, and an amorphous silicon-based layer may be used as the p-type layer. For the p-type layer, an alloy material of amorphous or microcrystalline silicon carbide, silicon germanium, or the like may be used.

It is preferable that the conductive type (p-type and n-type) silicon-based layers have a thickness in the range between 3 nm and 100 nm, further preferably between 5 nm and 50 nm.

It is preferable that the intrinsic amorphous silicon layer is formed by the plasma CVD method while the temperature of an undercoating is set to be 450° C. or lower. This layer is formed as a thin film of substantially an intrinsic semiconductor with the density of impurity atoms determining its conductive type being limited to $1 \times 10^{18}$ cm$^-$ or lower. It is preferable that the thickness of the intrinsic amorphous silicon layer is in the range between 0.05 µm and 0.5 µm. However, in an amorphous silicon-based thin film photovoltaic unit, an amorphous silicon carbide layer (for instance, an amorphous silicon carbide layer formed of amorphous silicon containing 10 atom % carbon or less) or an amorphous silicon germanium layer (for example, an amorphous silicon germanium layer formed of amorphous silicon containing 30 atom % germanium or less) of an alloy material may be formed instead of the intrinsic amorphous silicon layer.

Similarly, a crystalline silicon-based thin film photovoltaic unit can be formed by depositing respective p-type, i-type, and n-type semiconductor layers in this order by the plasma CVD method following the same procedure as that used for the amorphous silicon-based thin film photovoltaic unit.

It is preferable that as the back electrode, at least one metallic layer formed of at least one material selected from Al, Ag, Au, Cu, Pt, and Cr is formed by sputtering or vapor deposition. In addition, a layer formed of conductive oxide such as ITO, $SnO_2$, ZnO, or the like may be formed between the photovoltaic unit and the back electrode.

The photoelectric conversion device of the present invention is not particularly limited. However, it is preferable that the photoelectric conversion device includes a crystalline silicon-based thin film photovoltaic unit. This unit has a lower open circuit voltage and a higher short-circuit current density than those found in an amorphous silicon-based thin film photovoltaic unit. In this unit, therefore, the light transmittance contributes to the conversion efficiency more than the sheet resistance of the conductive film on the glass sheet does.

Similarly in this case, a material with a crystalline fraction of at least 50% in volume is taken as corresponding to a "crystalline" material even if amorphous portions are contained regionally. In addition to the amorphous or crystalline silicon, a semiconductor material containing at least 50 atom % silicon (for instance, amorphous silicon germanium) also is considered as a "silicon-based" material.

Figure 5:
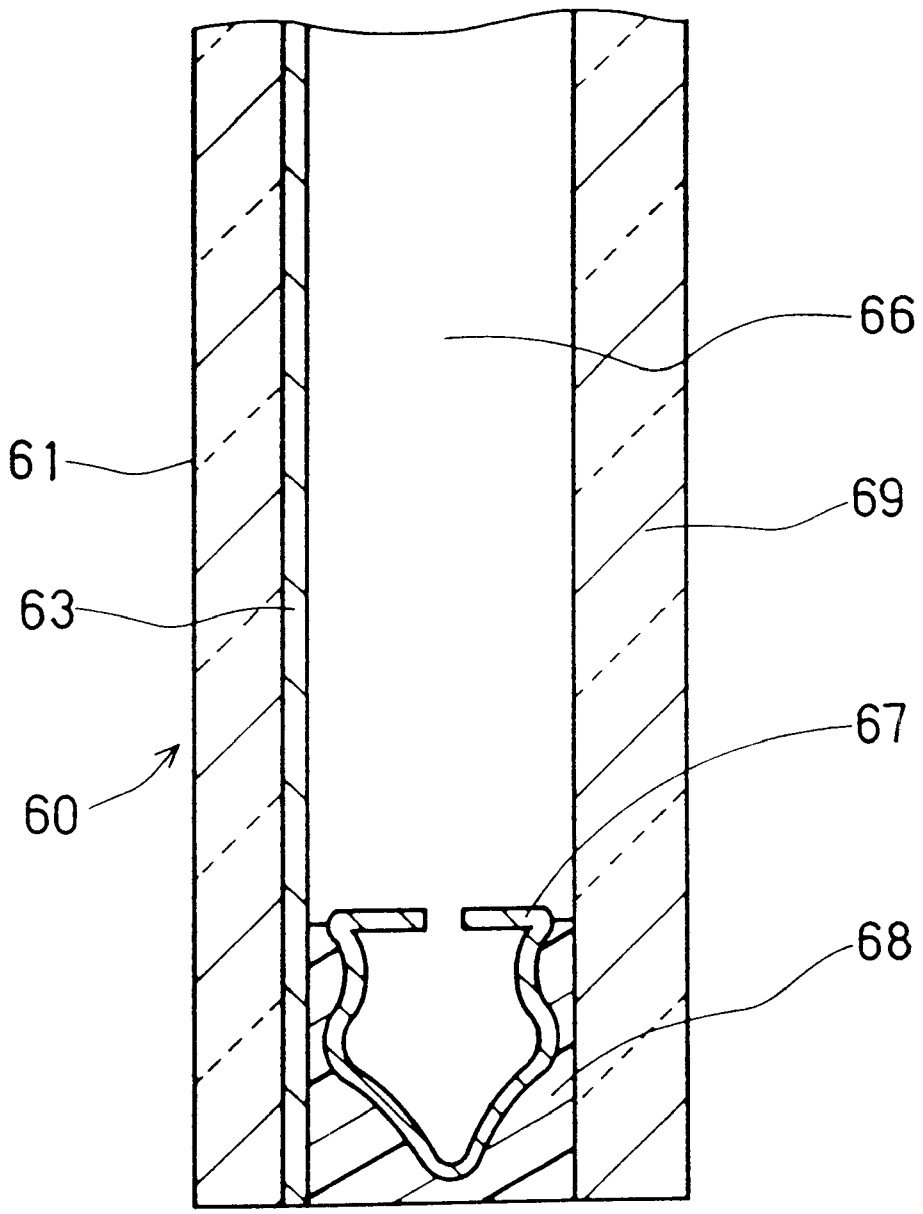
FIG. 5 is a sectional view of an embodiment of a double-glazing unit according to the present invention.

FIG. 5 is a sectional view showing an embodiment of a double-glazing unit according to the present invention. In the double-glazing unit shown in FIG. 5, a transparent layered product 60 in which a crystalline coating film 63 is formed on a glass sheet 61 is positioned so that the coating film 63 faces an air layer 66. In the transparent layered product, other layers such as an undercoating film or the like may be formed, which is not shown in the figure. Similarly in this case, as the crystalline coating film, a conductive coating film is used. The peripheries of the transparent layered product 60 and a glass sheet 69 are bonded with a sealant 68 via a spacer 67 containing a desiccant. The glass sheet 69 may be a transparent layered product in which a crystalline coating film is formed.

The air layer 66 may be formed as a low pressure layer by exhausting the inside air to reduce the pressure. When the pressure inside the air layer 66 is reduced, the thermal insulation effect or the like can be improved further. When the low pressure layer is used, it is preferable that the peripheries of the transparent layered product and the glass sheet are sealed using, for example, low-melting-point glass instead of using the spacer 67 and the sealant 68. In this case, it is preferred to place a spacer in the low pressure layer to maintain the space between the transparent layered product and the glass sheet. Instead of the air layer 66, an inert gas layer filled with an inert gas such as an argon gas or the like may be used.

The above-mentioned double-glazing unit can be used as window glass for buildings with an improved thermal insulation property due to the low emissivity of the conductive coating film. The double-glazing unit using the transparent layered product also can be used as window glass with an excellent electromagnetic shielding characteristic. Furthermore, it also can be used as glass for a door of a refrigerated display case for shops. When it is used for a door of a refrigerator, the transparent layered product is positioned outside the refrigerator. When being used for an electromagnetic shielding window or a refrigerator, the double-glazing unit shown in the figure is further processed. For example, in the case of the former, a ground wire is provided for maintaining the conductive coating film to have ground potential. In the case of the latter, an electrode terminal is formed for utilizing the double-glazing unit as a heating element by applying voltage to the conductive coating film, and a wiring is provided for connecting the electrode terminal and a power supply.

Figure 6:
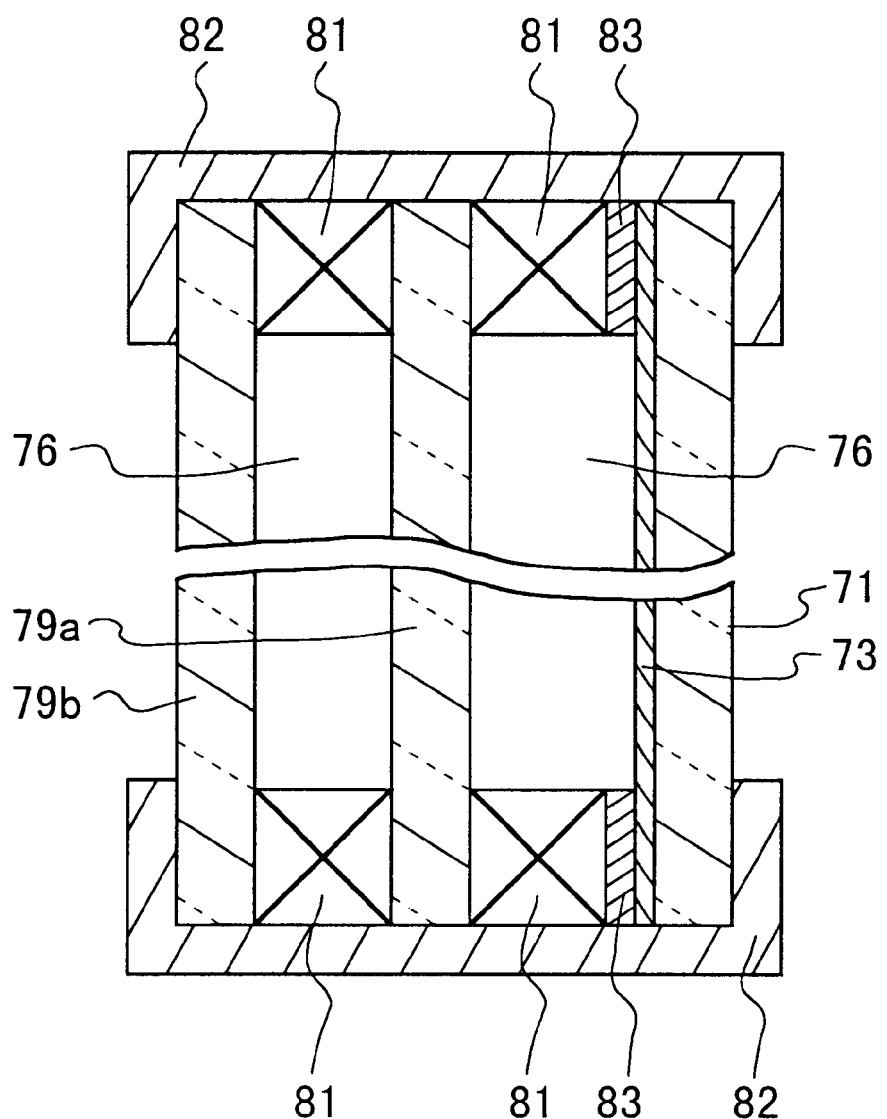
FIG. 6 is a sectional view of an embodiment of a glass door of a refrigerated display case using a transparent layered product according to the present invention.

FIG. 6 is a sectional view of an embodiment of a glass door including a transparent layered product according to the present invention. In this glass door, a transparent layered product 71 and glass sheets 79a and 79b are positioned with spaces via air layers 76 and spacers 81, which are combined to form one body using a frame 82, thus forming a multiple-glazing unit. Similarly in this multiple-glazing unit, a conductive crystalline coating film 73 is formed on the side of the air layer 76. In order to use the coating film 73 as a resistor, electrode terminals 83 are positioned in contact with the coating film 73 at the both ends of the coating film 73. This glass door has a function for preventing fogging caused by the heat generation and is suitable as an opening/closing door of a display-type refrigerator used frequently in shops for selling food stuffs or the like.

In the above-mentioned embodiment, the description was directed to the crystalline coating film. However, the present invention also can be applied to an amorphous film.

EXAMPLES

The present invention will be described further in detail using examples as follows, but is not limited by the following examples.

In the following Examples 1 to 12 and Comparative Examples 1 to 3, a device for depositing a film on a glass ribbon as described above is used. Inside a float bath, 98 vol. % nitrogen and 2 vol. % hydrogen were supplied so that the pressure inside the bath was maintained to be slightly higher than that outside the bath, and thus the inside of the bath was maintained under a nonoxidative atmosphere. The temperature of the glass ribbon was measured using a pyrometer at a location slightly upstream from the place where the films were formed. On the other hand, in Comparative Examples 4 to 6, respective films including a fluorine-containing tin oxide film as a crystalline coating film were deposited on a precut glass sheet by a CVD method using a film deposition device kept open to the atmosphere.

Examples 1 to 12

Soda-lime silica glass was melted in a furnace and the molten material was poured into the float bath, which then was formed into a glass ribbon with a thickness of 4 mm on a tin bath. When the glass ribbon passed below a nozzle for film deposition (a coater) on the furthest upstream side, a mixed gas containing dimethyltin dichloride (vapor), oxygen, nitrogen, and helium was supplied to deposit a tin oxide film on the glass ribbon. Then, when the glass ribbon passed below a coater on the downstream side, a mixed gas containing monosilane, ethylene, oxygen, and nitrogen was supplied to deposit a silicon oxide film on the tin oxide film. Subsequently, when the glass ribbon passed below a coater on the further downstream side, a mixed gas containing dimethyltin dichloride (vapor), oxygen, water vapor, nitrogen, helium, and hydrogen fluoride was supplied to form a fluorine-containing tin oxide film. This glass ribbon was carried into an annealing furnace from the float bath and was cut to have a predetermined size further downstream.

In the above respective examples, the temperature of the glass ribbon was set to be in the range between about 630° C. and about 710° C.

Using the glass sheet thus obtained as a substrate, an amorphous silicon carbide layer with a thickness of 10 nm was deposited on the fluorine-containing tin oxide film by the plasma CVD method using monosilane, methane, and diborane as raw materials.

Comparative Examples 1 to 3

As in the above-mentioned examples except that the temperature of the glass ribbon was set to be in the range between about 720° C. and about 735° C., a tin oxide film, a silicon oxide film, and a fluorine-containing tin oxide film were deposited in this order, thus obtaining a glass sheet.

Comparative Examples 4 to 6

A soda-lime silica glass sheet with a thickness of 4 mm that had been precut to have a size of 450 mm×450 mm was placed on a mesh belt and was passed through a heating furnace to be heated up to about 600° C. When the glass sheet passed below a coater, a mixed gas containing dimethyltin dichloride (vapor), oxygen, nitrogen, and helium was supplied to deposit a tin oxide film. The glass sheet was annealed and then was taken out. This deposition process was repeated to deposit a silicon oxide film on the tin oxide film using a mixed gas containing monosilane and nitrogen as a raw material. Further, the above-mentioned film deposition process was repeated to deposit a fluorine-containing tin oxide film on the silicon oxide film using a mixed gas containing monobutyltin trichloride (vapor), oxygen, water vapor, nitrogen, and trifluoroacetic acid, as a raw material.

With respect to the respective glass sheets thus obtained according to the respective comparative examples, an amorphous silicon carbide layer with a thickness of 10 nm was deposited on the fluorine-containing tin oxide film using monosilane, methane, and diborane as raw materials by the plasma CVD method.

With respect to transparent layered products obtained according to the respective examples and comparative examples, visible-light transmittance was measured with the glass sheet side positioned as an incident side.

With respect to transparent layered products obtained as in the above examples and comparative examples except that no amorphous silicon carbide layer was formed, a shape profile of surface roughness of fluorine- containing oxide films was measured by an atomic force microscope over a region of 10 μm×10 μm. The portion between the highest part (the top of a convex portion) and the lowest part (the bottom of a concave portion) was divided into 10 parts, and their respective cross-sectional areas were determined. Then, the cross-sectional area distribution in the depth direction was plotted, thus obtaining a cross-sectional area distribution curve in each case. Further, this curve was allocated to the variation in refractive index, thus obtaining a curve to be used as a refractive-index distribution curve.

It was confirmed as follows that the curve obtained was able to be used as the refractive index distribution curve. Single-layer films with a smooth surface corresponding to the respective layers were produced, and the wavelength distribution of the refractive index and extinction coefficient of the respective single-layer films were determined using a spectral ellipsometer, which was used for the calculation of optical multilayered films. It has been well known that if the refractive index and extinction coefficient of respective films were given, the reflectance and transmittance, particularly the visible-light reflectance and the visible-light transmittance of the optical multilayered film, can be determined by the calculation. The curve obtained by the above-mentioned measurement was split stepwise to small portions to assume a multilayered film with stacked thin films having refractive indexes corresponding to the respective step portions. Such an assumption is a method generally used in the calculation of an optical multilayered film. Then, the reflectance and transmittance obtained by the optical calculation based on the assumption were compared with reflectance and transmittance obtained by actual measurement. As a result, they were in good agreement. Thus, the validity of the refractive index distribution curve obtained using the atomic force microscope was confirmed.

Similarly in the transparent layered product in which an amorphous silicon carbide layer was formed, the reflectance and transmittance obtained by actual measurement were in good agreement with those obtained by the optical calculation.

With respect to the respective examples and comparative examples, the thickness of the transition layer and the ratio of the transition layer to a nontransition layer in the crystalline coating film were determined from the refractive index distribution curve obtained by the above-mentioned measurement.

Table 1 shows the results together with the film thickness of each film and the glass temperature during film deposition.

TABLE 1

| | Ratio of Transition Layer (%) | $SnO_2$ Film (nm) | $SiO_2$ Film (nm) | $SnO_2$:F Film (nm) | Glass Temperature (° C.) | Visible-Light Transmittance (%) |
|---|---|---|---|---|---|---|
| Example 1 | 20 | 35 | 30 | 720 | 642 | 69.1 |
| Example 2 | 29 | 37 | 28 | 720 | 655 | 67.7 |
| Example 3 | 50 | 45 | 25 | 720 | 678 | 67.8 |
| Example 4 | 61 | 60 | 18 | 720 | 705 | 66.4 |
| Example 5 | 13 | 30 | 35 | 720 | 634 | 66.4 |
| Example 6 | 30 | 28 | 20 | 720 | 673 | 68.8 |
| Example 7 | 30 | 30 | 15 | 720 | 652 | 67.7 |
| Example 8 | 45 | 40 | 16 | 850 | 660 | 66.8 |
| Example 9 | 25 | 40 | 33 | 850 | 660 | 66.3 |
| Example 10 | 16 | 32 | 34 | 650 | 638 | 68.6 |
| Example 11 | 37 | 38 | 22 | 650 | 658 | 68.6 |
| Example 12 | 64 | 62 | 14 | 650 | 709 | 66.1 |
| Comparative Example 1 | 70 | 60 | 15 | 720 | 725 | 65.8 |
| Comparative Example 2 | 70 | 65 | 22 | 750 | 734 | 65.8 |
| Comparative Example 3 | 70 | 55 | 13 | 750 | 719 | 65.9 |
| Comparative Example 4 | 10 | 30 | 40 | 720 | 600 | 62.9 |
| Comparative Example 5 | 10 | 30 | 25 | 750 | 584 | 65.8 |
| Comparative Example 6 | 10 | 30 | 15 | 750 | 593 | 64.3 |

In Table 1, the $SnO_2$:F film denotes a fluorine-containing tin oxide film.

When the glass temperature was set to be in the range between about 630° C. and 710° C., the ratio of the transition layer was in the range between 13% and 65%. As described above, however, the ratio of the transition layer also is affected by the factors other than the glass temperature. For example, by comparing Example 8 and Example 9 in which the silicon oxide films have different thicknesses, although the glass temperature and the thicknesses of the other films are set to be the same, it can be confirmed that the ratio of the transition layer decreases with the increase in thickness of the silicon oxide film. The present invention is not limited to the transparent layered products produced using the glass temperatures within the range described in the above-mentioned examples.

Example 13

As in the above-mentioned examples except that only a silicon oxide film was employed as the undercoating film, a transparent layered product was obtained. On this transparent layered product, an amorphous silicon carbide layer (a p-type layer) with a thickness of 10 nm was deposited as in the above.

Comparative Example 7

As in the above-mentioned Comparative Examples 4 to 6 except that only a silicon oxide film was employed as the undercoating film, a transparent layered product was obtained. On this transparent layered product, an amorphous silicon carbide layer (a p-type layer) with a thickness of 10 nm was deposited as in the above.

Example 14

As in the above-mentioned Examples 1 to 12, a transparent layered product was obtained. On this transparent layered product, an amorphous silicon carbide layer (a p-type layer) with a thickness of 10 nm was deposited as in the above. Further, by the same plasma CVD method, an amorphous silicon layer (an i-type layer) with a thickness of 350 nm was stacked using monosilane as a raw material.

Comparative Example 8

As in the above-mentioned Comparative Examples 4 to 6, a transparent layered product was obtained. On this transparent layered product, an amorphous silicon carbide layer (a p-type layer) with a thickness of 10 nm was deposited as in the above. Further, by the same plasma CVD method, an amorphous silicon layer (an i-type layer) with a thickness of 350 nm was stacked using monosilane as a raw material.

With respect to these transparent layered products, the ratio of the respective transition layers and visible-light transmittance were measured as in the above. In addition, visible-light reflectance also was measured. The results are shown in Table 2.

As shown in Table 2, the control of the transition layer results in the increase in the visible-light transmittance and the decrease in the visible-light reflectance. In the above-mentioned respective examples, an amorphous silicon carbide layer (a p-type layer) was formed on a crystalline coating film based on the premise that the transparent layered product was to be used in a photoelectric conversion device. From the results, it can be found that the suitable control of the ratio of the transition layer results in the increase in the quantity of light entering the i-type layer formed on the p-type layer.

The transparent layered products of the above-mentioned respective examples were evaluated based on the premise that they were to be used in photoelectric conversion devices. However, as shown in the following examples, the effects of the transparent layered products of the present invention are exhibited even when they are used for the other applications with no thin film being formed on the crystalline coating film.

Example 15

As in the above-mentioned respective examples except that the thickness of the fluorine-containing oxide film was set to be 520 nm, a transparent layered product was obtained. The above-mentioned thickness of the fluorine-containing oxide film is in a preferable range for use as electromagnetic shielding glass or the like.

Comparative Example 9

As in the above-mentioned Comparative Examples 4 to 6 except that the thickness of the fluorine-containing oxide film was set to be 520 nm, a transparent layered product was obtained.

Example 16

As in the above-mentioned respective examples except that the thickness of the fluorine-containing oxide film was set to be 420 nm, a transparent layered product was obtained. The above-mentioned thickness of the fluorine-containing oxide film is in a preferable range for use as a glass for a door of a refrigerated display case or the like.

Comparative Example 10

As in the above-mentioned Comparative Examples 4 to 6 except that the thickness of the fluorine-containing oxide film was set to be 420 nm, a transparent layered product was obtained.

TABLE 2

| | Ratio of Transition Layer (%) | $SnO_2$ Film (nm) | $SiO_2$ Film (nm) | $SnO_2$:F Film (nm) | Glass Temperature (° C.) | Visible-Light Transmittance (%) | Visible-Light Reflectance (%) |
|---|---|---|---|---|---|---|---|
| Example 13 | 15 | — | 40 | 720 | 700 | 67.9 | 24.3 |
| Comparative Example 7 | 7 | — | 40 | 720 | 570 | 65.8 | 25.9 |
| Example 14 | 15 | 25 | 15 | 720 | 700 | — | 10.3 |
| Comparative Example 8 | 10 | 25 | 15 | 720 | 600 | — | 11.1 |

With respect to these transparent layered products, the ratios of the respective transition layers and visible-light transmittance were measured as in the above. In addition, visible-light reflectance also was measured. The results are shown in Table 3.

TABLE 3

|  | Ratio of Transition Layer (%) | SnO$_2$ Film (nm) | SiO$_2$ Film (nm) | SnO$_2$:F Film (nm) | Glass Temperature (° C.) | Visible-Light Transmittance (%) | Visible-Light Reflectance (%) |
| --- | --- | --- | --- | --- | --- | --- | --- |
| Example 15 | 20 | 35 | 30 | 520 | 685 | 82.7 | 13.2 |
| Comparative Example 9 | 10 | 35 | 30 | 520 | 600 | 82.2 | 13.7 |
| Example 16 | 17 | 45 | 40 | 420 | 680 | 84.2 | 12.2 |
| Comparative Example 10 | 10 | 45 | 40 | 420 | 600 | 83.8 | 12.4 |

In the transparent layered products produced according to the above-mentioned respective examples, a film containing tin oxide as the main component was used as the crystalline coating film. However, the control of the ratio of the transition layer also affects the optical characteristics when the film contains a material other than tin oxide as the main component. An example of antifouling glass using a titanium oxide layer is described as follows.

Example 17

After the formation of an undercoating film as in the above-mentioned respective examples, from a coater on the further downstream side, a mixed gas containing titanium isopropoxide (vapor), oxygen, water vapor, nitrogen, helium, and trifluoroacetic acid was supplied to deposit a titanium oxide (TiO$_2$) film with a thickness of 400 nm on the undercoating film. Subsequently, from a coater on the further downstream side, a mixed gas containing monosilane, ethylene, oxygen, and nitrogen was supplied to deposit a silicon oxide film with a thickness of 10 nm on the titanium oxide film.

Comparative Example 11

After the formation of an undercoating film as in the above-mentioned Comparative Examples 4 to 6, using the same materials as those in Example 17, a titanium oxide film with a thickness of 400 nm and a silicon oxide film with a thickness of 10 nm were stacked on the undercoating film in this order.

With respect to these transparent layered products, the ratios of the respective transition layers and visible-light transmittance were measured as in the above. The results are shown in Table 4.

Example 18

On the conductive film of the glass sheet with a conductive film according to Example 6, an amorphous silicon photovoltaic unit was formed by the plasma CVD method, thus obtaining a thin film photoelectric conversion device. In the pin junction included in the amorphous silicon photovoltaic unit, a p-type amorphous silicon carbide layer and an n-type amorphous silicon layer were used and had thicknesses of 15 nm and 30 nm, respectively. An intrinsic amorphous silicon layer (i-type) was formed by a RF plasma CVD method. As film deposition conditions, a reaction gas of silane, a pressure inside a reaction chamber of about 40 Pa, a RF power density of 15 mW/cm$^2$, and a film deposition temperature of 150° C. were used. An intrinsic amorphous silicon film deposited directly on a glass substrate to have a thickness of 300 nm under the same film deposition conditions as those described above had a dark conductivity of $5 \times 10^{-10}$ S/cm. The thickness of the intrinsic amorphous silicon layer was set to be 300 nm. Finally, as a back electrode, an ITO film with a thickness of 80 nm and an Ag film with a thickness of 300 nm were deposited on the amorphous silicon photovoltaic unit by sputtering in this order.

The output characteristics of the thin film photoelectric conversion device (with a photovoltaic area of 1 cm$^2$) thus produced were measured while light of AM1.5 (100 mW/cm$^2$) was irradiated as incident light. The results included an open circuit voltage of 0.89V, a short-circuit current density of 16.3 mA/cm$^2$, a fill factor of 71.9%, and a conversion efficiency of 10.4%. Further, an optical degradation test was carried out by irradiating light of AM1.5 (100 mW/cm$^2$) at 48° C. After 550 hours irradiation, the conversion efficiency was degraded up to 8.6%.

As described above, according to the present invention, a transparent layered product in which a transition layer is allowed to have a suitable thickness for improving the light transmittance can be provided. This transparent layered product is useful for articles using glass such as a multiple-glazing unit, a photoelectric conversion device, or the like.

TABLE 4

|  | Ratio of Transition Layer (%) | SnO$_2$ Film (nm) | SiO$_2$ Film (nm) | TiO$_2$ Film (nm) | SiO$_2$ Film (nm) | Glass Temperature (° C.) | Visible-Light Transmittance (%) |
| --- | --- | --- | --- | --- | --- | --- | --- |
| Example 17 | 20 | 35 | 25 | 400 | 10 | 700 | 73.2 |
| Comparative Example 11 | 10 | 35 | 25 | 400 | 10 | 600 | 72.1 |

Particularly, in a photoelectric conversion device, the conversion efficiency is improved by the light trapping effect due to the surface roughness of a coating film and the increase in quantity of incident light on its photovoltaic layer.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A transparent layered product, comprising:
   a glass sheet;
   an undercoating film comprising at least two layers formed on the glass sheet, wherein the undercoating film has a surface roughness; and
   a coating film formed on the undercoating film,
   wherein the coating film has a surface roughness and a transition layer at its surface in which a refractive index varies continuously in its thickness direction,
   wherein a thickness of the transition layer ranges from 13% to 65% of a thickness of a layer having a substantially constant refractive index in the coating film.

2. The transparent layered product according to claim 1, wherein the coating film is a crystalline coating film, and the roughness is caused by crystal grains in the crystalline coating film.

3. The transparent layered product according to claim 2, wherein the crystalline coating film contains, as a main component, at least one selected from the group consisting of tin oxide, zinc oxide, indium oxide, and titanium oxide.

4. The transparent layered product according to claim 1, wherein the undercoating film is a coating film formed by thermal decomposition of a material containing halogen, and the undercoating film has a surface with roughness caused by production of or loss after the production of compound grains of an alkaline component in the glass sheet and the halogen.

5. The transparent layered product according to claim 1, wherein the thickness of the coating film ranges from 400 nm to 1200 nm.

6. The transparent layered product according to claim 1, wherein the coating film is a conductive coating film.

7. A multiple-glazing unit, comprising:
   at least two transparent substrates; and
   at least one inner layer selected from the group consisting of an air layer, an inert gas layer, and a low pressure layer,
   the at least two transparent substrates being positioned so as to oppose each other via the at least one inner layer,
   wherein at least one of the at least two transparent substrates is the transparent layered product according to claim 1.

8. A photoelectric conversion device, comprising:
   a transparent layered product, including
     a glass sheet,
     an undercoating film comprising at least two layers formed on the glass sheet,
   wherein the undercoating film has a surface roughness,
     a conductive crystalline coating film, which is formed on the undercoating film, the coating film having a surface roughness;
   at least one photoelectric conversion unit; and
   a back electrode,
   wherein the crystalline coating film includes, at its surface, a transition layer in which a refractive index varies continuously in its thickness direction, and
   the at least one photoelectric conversion unit and the back electrode are stacked on the crystalline coating film in this order,
   wherein the transition layer has a thickness in a range between 13% and 65% of a thickness of a layer having a substantially constant refractive index in the crystalline coating film.

9. A method of manufacturing a transparent layered product comprising:
   forming an undercoating film comprising of at least two layers by a CVD method on a glass ribbon in a glass sheet production line, and
   forming a coating film by a CVD method on the undercoating film in the production line,
   wherein the temperature of the glass ribbon during the forming of the undercoating film and the coating film ranges from approximately 615° C. to 715° C.,
   the undercoating is formed so as to have a rough surface, and
   the coating film is formed so as to have a transition layer at its surface in which a refractive index of the transition layer varies continuously in its thickness direction,
   wherein a thickness of the transition layer ranges from 13% to 65% of a thickness of a layer having a substantially constant refractive index in the coating film.

* * * * *

UNITED STATES PATENT AND TRADEMARK OFFICE
CERTIFICATE OF CORRECTION

PATENT NO. : 6,444,898 B1 Page 1 of 1
DATED : September 3, 2002
INVENTOR(S) : Fujisawa et al.

It is certified that error appears in the above-identified patent and that said Letters Patent is hereby corrected as shown below:

<u>Title page,</u>
Item [73], Assignee, insert -- Kaneka Corporation, Osaka (JP) -- after "Nippon Sheet Glass Co., Ltd., Osaka (JP)"

Signed and Sealed this

Thirteenth Day of July, 2004

JON W. DUDAS
*Acting Director of the United States Patent and Trademark Office*